US008913548B2

(12) United States Patent
Youn et al.

(10) Patent No.: US 8,913,548 B2
(45) Date of Patent: Dec. 16, 2014

(54) METHOD OF CONTROL INFORMATION FOR SUPPORTING RELAY SYSTEM

(75) Inventors: Ae Ran Youn, Anyang-si (KR); Jin Sam Kwak, Anyang-si (KR); Kyu Jin Park, Anyang-si (KR); Ji Wook Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 345 days.

(21) Appl. No.: 13/141,536

(22) PCT Filed: Dec. 3, 2009

(86) PCT No.: PCT/KR2009/007200
§ 371 (c)(1),
(2), (4) Date: Jul. 20, 2011

(87) PCT Pub. No.: WO2010/074423
PCT Pub. Date: Jul. 1, 2010

(65) Prior Publication Data
US 2011/0268016 A1 Nov. 3, 2011

(30) Foreign Application Priority Data
Dec. 23, 2008 (KR) ........................ 10-2008-0132141

(51) Int. Cl.
| H04B 7/212 | (2006.01) |
| H04L 12/28 | (2006.01) |
| H04W 74/00 | (2009.01) |
| H04L 5/00 | (2006.01) |
| H04L 27/26 | (2006.01) |
| H04B 7/26 | (2006.01) |
| H04W 84/04 | (2009.01) |

(52) U.S. Cl.
CPC ......... *H04W 74/006* (2013.01); *H04L 27/2601* (2013.01); *H04B 7/2606* (2013.01); *H04L 5/0003* (2013.01); *H04L 5/0044* (2013.01); *H04L 5/0053* (2013.01); *H04W 84/047* (2013.01); *H04L 5/0048* (2013.01)
USPC .......................................... 370/321; 370/401

(58) Field of Classification Search
None
See application file for complete search history.

(56) References Cited

U.S. PATENT DOCUMENTS

| 6,965,568 | B1 | 11/2005 | Larsen |
| 2002/0051425 | A1 | 5/2002 | Larsson |
| 2005/0059342 | A1 | 3/2005 | Engels et al. |

(Continued)

FOREIGN PATENT DOCUMENTS

KR 2008-0080724 9/2008

OTHER PUBLICATIONS

International Search Report from PCT/KR2009/007200 (PCT corresponding to present application).

*Primary Examiner* — Gregory Sefcheck
*Assistant Examiner* — Joshua Smith
(74) *Attorney, Agent, or Firm* — Morgan, Lewis & Bockius LLP

(57) ABSTRACT

A frame structure supporting a relay and a method of transmitting control information for supporting a relay system are disclosed. The method of transmitting control information for supporting a relay system comprises configuring a frame to which the relay system is applied; and transmitting a first message to one or more of a mobile station and relay stations, the first message including offset information indicating a beginning time of the frame and zone allocation information indicating configuration of the frame. In this case, a downlink zone of the frame includes a downlink transmit zone and a downlink access zone.

10 Claims, 12 Drawing Sheets

(56) References Cited

U.S. PATENT DOCUMENTS

| | | | |
|---|---|---|---|
| 2005/0221755 A1 | 10/2005 | Falconer et al. | |
| 2007/0153734 A1* | 7/2007 | Lee et al. | 370/329 |
| 2007/0201402 A1* | 8/2007 | Cho et al. | 370/330 |
| 2007/0268933 A1* | 11/2007 | Wu et al. | 370/474 |
| 2008/0095195 A1* | 4/2008 | Ahmadi et al. | 370/478 |
| 2008/0137583 A1* | 6/2008 | Sydir et al. | 370/315 |
| 2008/0137584 A1* | 6/2008 | Oh et al. | 370/315 |
| 2008/0212516 A1 | 9/2008 | Son et al. | |
| 2009/0086712 A1* | 4/2009 | Liu et al. | 370/350 |
| 2009/0141679 A1* | 6/2009 | Song et al. | 370/329 |
| 2010/0246475 A1* | 9/2010 | Naden et al. | 370/315 |

* cited by examiner

METHOD OF CONTROL INFORMATION FOR SUPPORTING RELAY SYSTEM

TECHNICAL FIELD

The present invention relates to a wireless access system, and more particularly, to a frame structure supporting a relay and a method of transmitting control information for supporting a relay system.

BACKGROUND ART

It is expected that a relay station (RS) will be widely used in a wireless communication system for next generation. Hereinafter, the relay station (RS) will be described in brief.

A standardization project newly titled multi-hop relay is being in progress in the IEEE (Institute of Electrical and Electronics Engineers) 802.16 of 2006 since the standard IEEE 802.16-2004 based on fixed subscriber mobile stations and the standard IEEE 802.16e-2005 for providing mobility of a subscriber mobile station.

This standardization project handled by a task group j (IEEE 802.16j) of the IEEE 802.16 has discussed usage models, terminologies, and technical requirements in the second conference in July, 2006 since the first conference in May, 2005. Hereinafter, the IEEE 802.16 task group j will be abbreviated as "802.16j".

The relay station to be described hereinafter will substantially be the same as a relay station considered by a 3GPP IMT-A (LTE-A) system. Also, a relay station that performs same or similar functions in various wireless access systems will be used similarly to the relay station described herein.

Project authorization request (PAR) of the 802.16j has two standardization tasks, i.e., coverage extension and throughput enhancement.

A network that uses a relation station includes a base station (BS), a relay station (RS), and a mobile station (MS). The mobile station can receive a radio signal through the relay station even outside a cell zone of the base station. Also, a mobile station located within the cell zone of the base station can establish a path of high quality, which has an adaptive modulation and coding (AMC) scheme of high level through the relay station. Accordingly, a user can obtain enhancement effect of overall system capacity through the same radio resource.

The standard to be made by the 802.16j project has predetermined requirements. For example, a mobile station based on the existing 802.16-2004 and 802.16e-2005 standards should perform communication with the relay station without additional function. Accordingly, an application range of the relay station can be limited to the existing system in such a manner that some functions for controlling the relay station are added to the relay station and the existing base station. It is expected that the standard of the relay station will serve as a main factor of the standardization The relay station could be regarded as a subscriber mobile station that performs operations of a physical layer and a medium access control layer. Although the relay station is mainly controlled by the base station, it may have a predetermined control function if necessary. Various relay stations will be considered as usage models which are currently discussed, and their examples include a fixed relay station, a mobile relay station for providing a temporary service to a specific zone, and a relay station that can be built in a car or subway.

Main technical issues which will be discussed later are as follows:

1. a procedure of identifying relay stations that exist in an zone of a base station and acquiring and maintaining information of a topology with the relay stations;
2. definition of a structure of a physical transport frame between a relay station and a mobile station having backward compatibility with the existing IEEE 802.16 system;
3. a signal procedure for providing mobility between relay stations or between a relay station and a base station; and
4. a network entry procedure of a relay station to a base station and a network entry procedure of a mobile station through a relay station.

Hereinafter, a structure of a general frame used in a wireless access system will be described.

FIG. 1 is a diagram illustrating a frame structure used in a broadband wireless access system (for example, IEEE 802.16).

Referring to FIG. 1, a horizontal axis of a frame is a time unit and represents orthogonal frequency division multiple access (OFDMA) symbols, and its vertical axis is a frequency unit and represents physical numbers of a subchannel. In FIG. 1, one frame is divided into data sequence channels for a certain time period by physical characteristics. In other words, one subframe includes a downlink subframe and an uplink subframe.

At this time, the downlink subframe may include a preamble, a frame control header (FCH), a downlink map (DL-MAP), an uplink map (UL-MAP), and one or more data bursts. Also, the uplink subframe can include one or more uplink data bursts and a ranging subchannel.

In FIG. 1, the preamble is specific sequence data located in a first symbol of each frame and is used so that the mobile station synchronizes with the base station or estimates a channel. The FCH is used to provide channel allocation information related to the DL-MAP and information of channel code. The DL-MAP/UL-MAP are medium access control (MAC) messages used by the downlink/uplink to indicate channel resource allocation to the mobile station. Also, the data burst represents a unit of data intended to be transmitted from the base station to the mobile station or from the mobile station to the base station.

A downlink channel descriptor (DCD) that can be used in FIG. 1 represents a MAC message for indicating physical characteristics of a downlink channel, and an uplink channel descriptor (UCD) represents a MAC message for indicating physical characteristics of an uplink channel.

In case of the downlink, referring to FIG. 1, the mobile station synchronizes with the base station by detecting the preamble transmitted from the base station. Afterwards, the mobile station can decode the downlink map using information acquired from the frame control header (FCH). The base station can transmit scheduling information for downlink or uplink resource allocation to the mobile station per frame (for example, 5 ms) using a downlink or uplink map (DL-MAP/UL-MAP) message.

DISCLOSURE OF INVENTION

Technical Problem

Various wireless access technologies intended to contrive commercialization currently discuss a frame structure for supporting a multi-hop relay. Accordingly, a method for transmitting and receiving a preamble, a synchronization channel (SCH) and/or a broadcast channel (BCH) among a base station, a relay station and mobile stations is required.

Accordingly, the present invention has been devised to satisfy the aforementioned technical requirements, and an object of the present invention is to provide a structure of a relay frame for supporting a relay system.

Another object of the present invention is to provide a method and apparatus for transmitting and receiving a synchronization channel and a broadcast channel to support a relay system.

It is to be understood that technical problems to be solved by the present invention are not limited to the aforementioned technical problems and other technical problems which are not mentioned will be apparent from the following description to the person with an ordinary skill in the art to which the present invention pertains.

Technical Solution

To solve the aforementioned technical problems, the present invention discloses a frame structure supporting a relay and a method of transmitting control information for supporting a relay system.

In one aspect of the present invention, a method of transmitting control information for supporting a relay system comprises configuring a frame to which the relay system is applied; and transmitting a first message to one or more of a mobile station and relay stations, the first message including offset information indicating a beginning time of the frame and zone allocation information indicating configuration of the frame. In this case, a downlink zone of the frame includes a downlink transmit zone and a downlink access zone.

The offset information includes symbol offset of the frame, a transmission period of a synchronization channel or broadcast channel, and symbol offset information of next frame. Also, the zone allocation information includes a downlink and uplink ratio (DL/UL ratio), a cyclic prefix (CP) length, subframe configuration information, and relay zone allocation information.

The first message is transmitted to one or more the mobile station and the relay stations in the downlink relay zone. Alternatively, the first message is transmitted to the mobile station in the downlink access zone.

In another aspect of the present invention, a method of transmitting control information for supporting a relay system comprises receiving a first message from a base station, the first message including preamble offset information indicating a beginning time of a first frame and zone allocation information indicating configuration of the first frame; and transmitting a second message to one or more of a mobile station and a subordinate relay station, the second message including frame offset information indicating a beginning time of a second frame used in a relay station and zone allocation information indicating configuration of the second frame.

The second frame includes a downlink receive zone, a gap, and a downlink transmit zone, and the second message is transmitted in the downlink transmit zone. Also, the second frame includes a downlink access zone, a gap, a bi-directional receive zone, and a bi-directional transmit zone, and the second message is transmitted in the bi-directional transmit zone.

Each of the first message and the second message is one of a preamble, a broadcast channel, a super frame header, and a system information message. Also, the frame offset information includes at least one of symbol offset of the second frame, a transmission period of a synchronization channel or broadcast channel, and symbol offset information of next second frame. Also, the zone allocation information includes a DL/UL ratio, a CP length, subframe configuration information, and relay zone allocation information.

In still another aspect of the present invention, a mobile station supporting a relay system comprises a processor; a receive module; a transmit module; and an antenna transmitting a radio signal received from the outside to the receive module and transmitting a radio signal, which is transferred from the transmit module, to the outside. In this case, the receive module performs demodulation and decoding for the radio signal transferred from the antenna, the transmit module performs modulation and coding for the data transferred from the processor, and the processor controls the receive module to receive a first message from a transmitting side to determine a frame structure of the transmitting side, the first message including offset information indicating a beginning time of the frame and zone allocation information indicating configuration of the frame.

The transmitting side includes a base station, an odd-hop relay station, and an even-hop relay station.

The first message is any one of a preamble, a broadcast channel, a super frame header, and a system information message.

The frame offset information includes at least one of symbol offset of the frame, a transmission period of a synchronization channel or broadcast channel, and symbol offset information of next frame.

The zone allocation information includes at least one of a downlink and uplink ratio (DL/UL ratio), a cyclic prefix (CP) length, subframe configuration information, and relay zone allocation information.

Each of the first message and the second message is one of a preamble, a broadcast channel, a super frame header, and system information message.

The aforementioned embodiments are only a part of the preferred embodiments of the present invention, and various embodiments reflecting technical features of the present invention will be understood by the person with ordinary skill in the art based on the detailed description of the present invention.

Advantageous Effects

According to the embodiments of the present invention, the following advantages can be obtained.

First, since a relay frame structure disclosed in the embodiments of the present invention is used, a reliable relay operation can be performed.

Second, since the method and apparatus for transmitting and receiving a synchronization channel and a broadcast channel for supporting a relay system is used, an effective relay can be provided.

Third, in the embodiments of the present invention, in order to support a multi-hop relay from a base station and a relay station, an identifier (for example, offset information) for transmitting the synchronization channel and the broadcast channel to a subordinate RS is used. In this case, the mobile station of the relay station and the lower relay station can acquire synchronization (SCH) from the base station or a superordinate relay station and receive system information (BCH).

It is to be understood that the advantages that can be obtained by the present invention are not limited to the aforementioned advantages and other advantages which are not mentioned will be apparent from the following description to the person with an ordinary skill in the art to which the present invention pertains.

MODE FOR THE INVENTION

Figure 1:
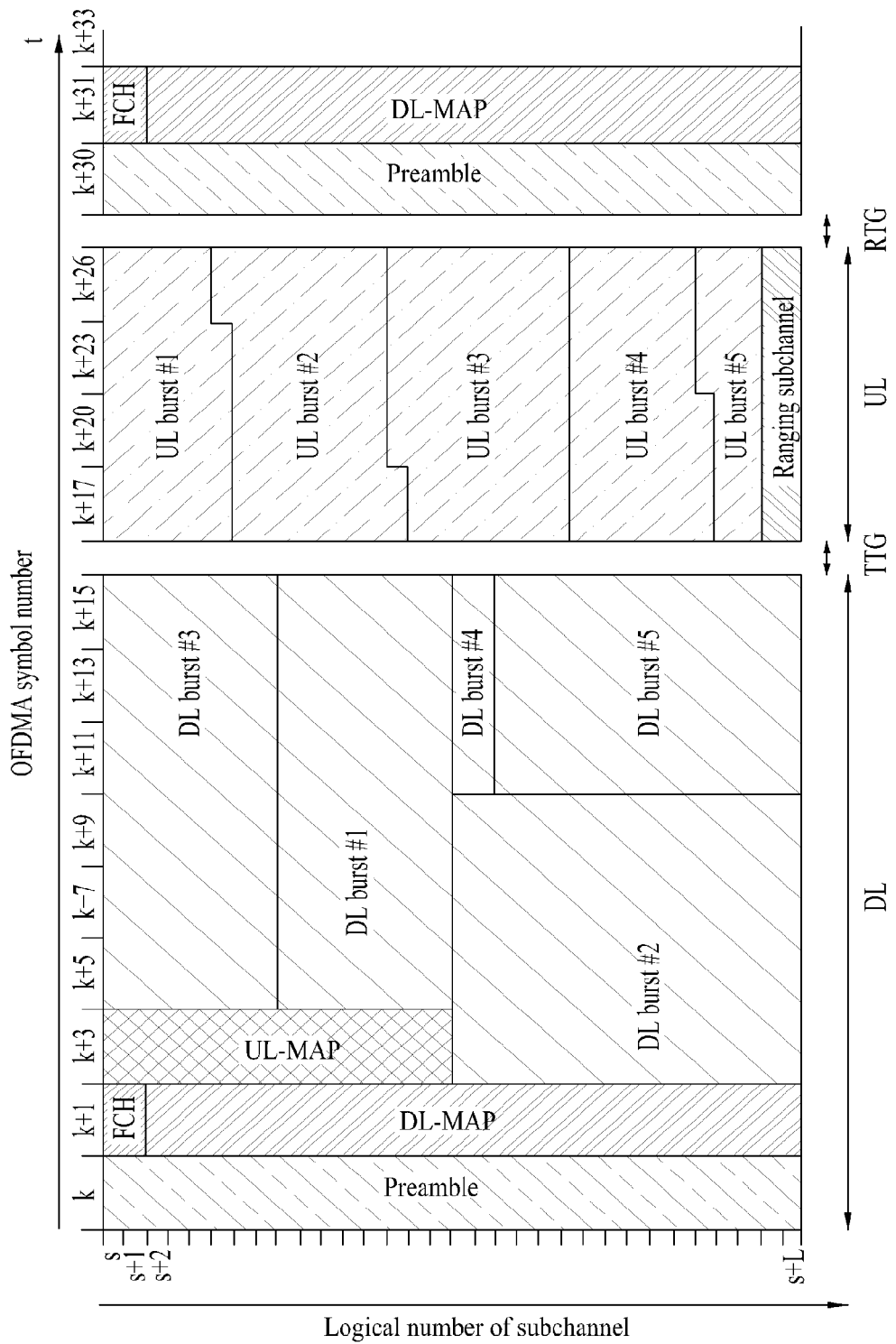
FIG. 1 is a diagram illustrating a frame structure used in a broadband wireless access system (for example, IEEE 802.16)

The present invention relates to a wireless access system. Hereinafter, a frame structure and method for supporting a relay will be described.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of the drawings, procedures or steps that may make the subject matter of the present invention obscure will not be described, and procedures or steps that can be understood by the person with ordinary skill in the art will not be described.

The embodiments of the present invention have been described based on the data transmission and reception between a base station and a mobile station. In this case, the base station means a terminal node of a network that performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station can be performed by the base station or network nodes other than the base station. The base station may be replaced with terms such as a fixed station, Node B, eNode B (eNB), and access point. Also, the mobile station may be replaced with terms such as a user equipment (UE), a subscriber station (SS), a mobile subscriber station (MSS), and a mobile terminal.

Furthermore, a transmitting side means a fixed and/or mobile node that provides data services or voice services while a receiving side means a fixed and/or mobile node that receives data services or voice services. Accordingly, in an uplink, the mobile station could be a transmitting side while the base station could be a receiving side. Likewise, in a downlink, the mobile station could be a receiving side while the base station could be a transmitting side.

Meanwhile, in the present invention, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone.

The embodiments according to the present invention can be implemented by various means, for example, hardware, firmware, software, or their combination.

If the embodiment according to the present invention is implemented by hardware, the method according to the embodiments of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention can be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, in the embodiments of the present invention, steps or parts which are not described to clarify technical spirits of the present invention can be supported by the above standard documents. Also, all terminologies disclosed herein can be described by the above standard documents. Particularly, the embodiments of the present invention can be supported by one or more of standard documents of the IEEE 802.16 system, i.e., P802.16-2004, P802.16e-2005 and P802.16Rev2.

Specific terminologies hereinafter described are provided to assist understanding of the present invention, and various modifications can be made in the specific terminologies within the range that they do not depart from technical spirits of the present invention.

For example, in the embodiments of the present invention, terminologies, i.e., a subordinate relay station and a superordinate relay station are used. The subordinate relay station and the superordinate relay station are complementary to each other. A first RS (for example, odd-hop RS) based on a base station BS could be the superordinate RS to a second RS (for example, even-hop RS), and a third RS (for example, another odd-hop RS) could be the subordinate RS to the second RS.

Figure 2:
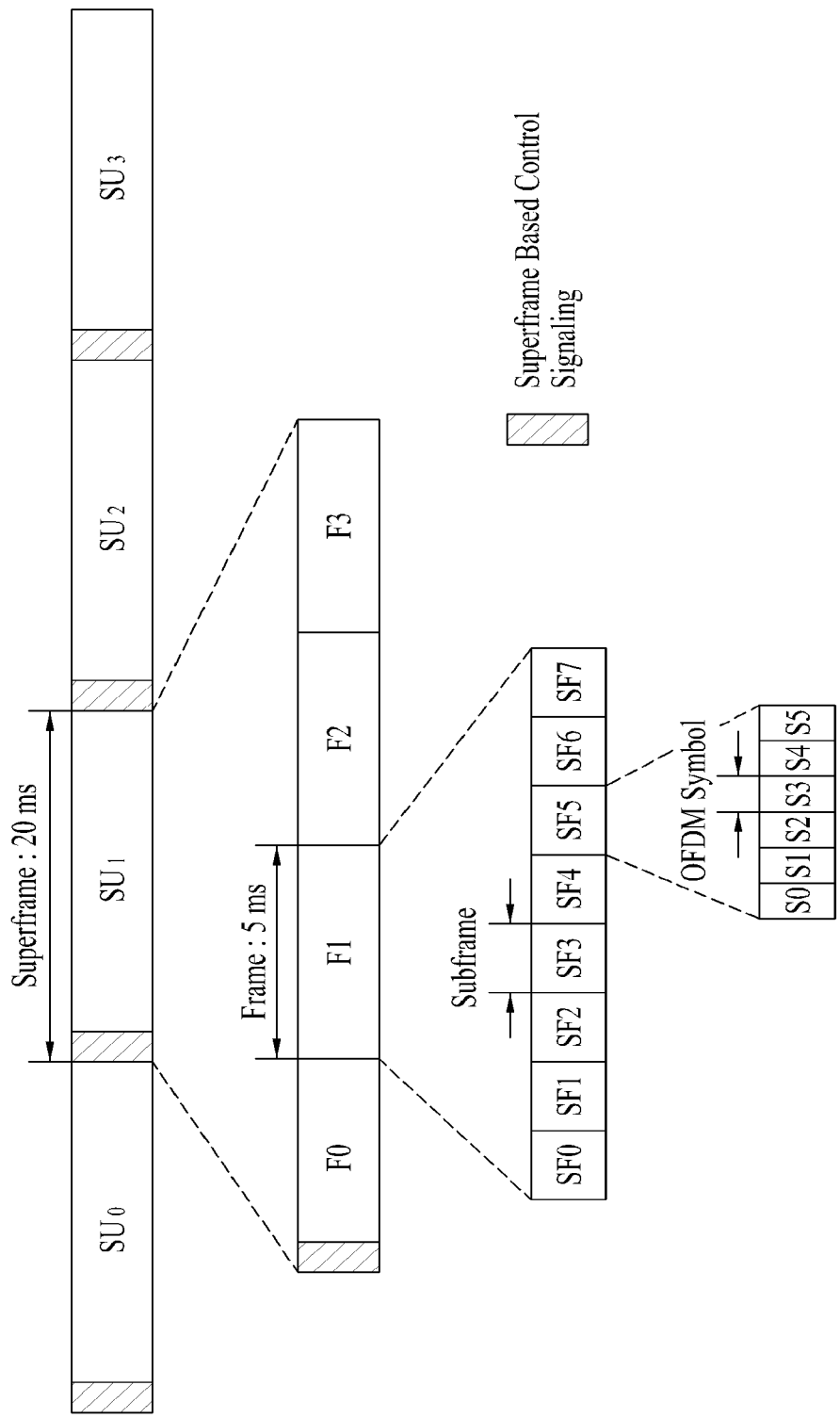
FIG. 2 is a diagram illustrating an example of a frame structure that can be used in the embodiments of the present invention.

FIG. 2 is a diagram illustrating an example of a frame structure that can be used in the embodiments of the present invention.

Referring to FIG. 2, one super frame (20 ms, SU1) includes one or more frames (for example, F0, F1, . . . , F3), each of which includes one or subframes (for example, SF0, SF1, . . . , SF7). Also, one subframe includes one or more OFDMA symbols.

The number and length of super frames, subframes and symbols can be controlled depending on user's requirements or system status. In the embodiments of the present invention, a terminology 'subframe' is used. In this case, 'subframe' means all lower frame structures generated by dividing one frame at a predetermined length.

The subframes used in the embodiments of the present invention can be configured in such a manner that a general frame is divided into one or more subframes. In this case, the number of subframes included in one frame can be determined by the number of symbols constituting the subframes. For example, it is assumed that one frame includes 48 symbols. If one subframe includes six symbols, one frame can include eight subframes. Also, if one subframe includes twelve symbols, one frame can include four subframes.

In FIG. 2, it is assumed that one super frame includes a length of 20 ms, and a frame includes a length of 5 ms. Namely, one super frame includes four frames. Also, one frame has a frame structure that it includes eight subframes. In this case, one subframe includes six OFDMA symbols.

In FIG. 2, each super frame includes a super frame header (SFH). In the embodiments of the present invention, the super frame header SFH may be referred to as superframe based control signaling.

Figure 3:
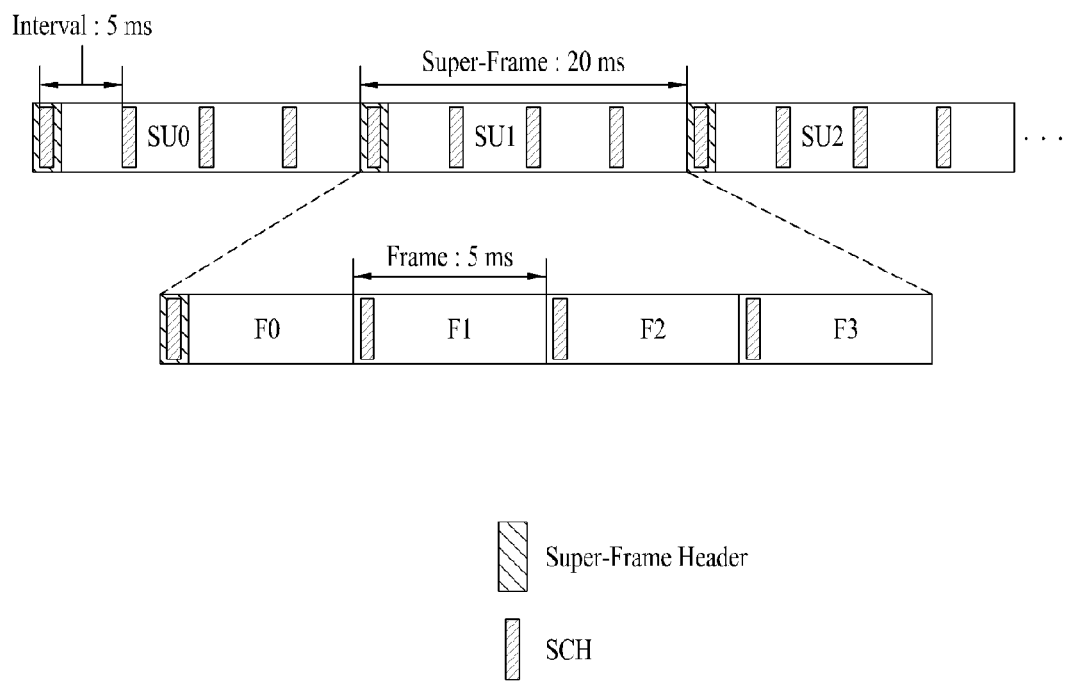
FIG. 3 is a diagram illustrating an example of a transmission location of a synchronization channel used in the embodiments of the present invention.

FIG. 3 is a diagram illustrating an example of a transmission location of a synchronization channel used in the embodiments of the present invention.

One synchronization channel (SCH) includes one or more OFDM symbols. In this case, in the embodiments of the present invention, the synchronization channel (SCH) is transmitted with a frequent transport period (for example, 5 ms). In the embodiments of the present invention, the number of OFDM symbols constituting the SCH and a transport period of the SCH can be varied depending on user's requirements or channel status. For example, the SCH can have a transport period of 1 ms to 20 ms, for example, 5 ms in the embodiments of the present invention.

Referring to FIG. 3, a base station can transmit the SCH to a mobile station once per frame (5 ms) included in a super frame. Of course, the base station may transmit the SCH to the mobile station once per two or more frames. Also, the base station may transmit the SCH to the mobile station once per subframe or two or more subframes.

Figure 4:
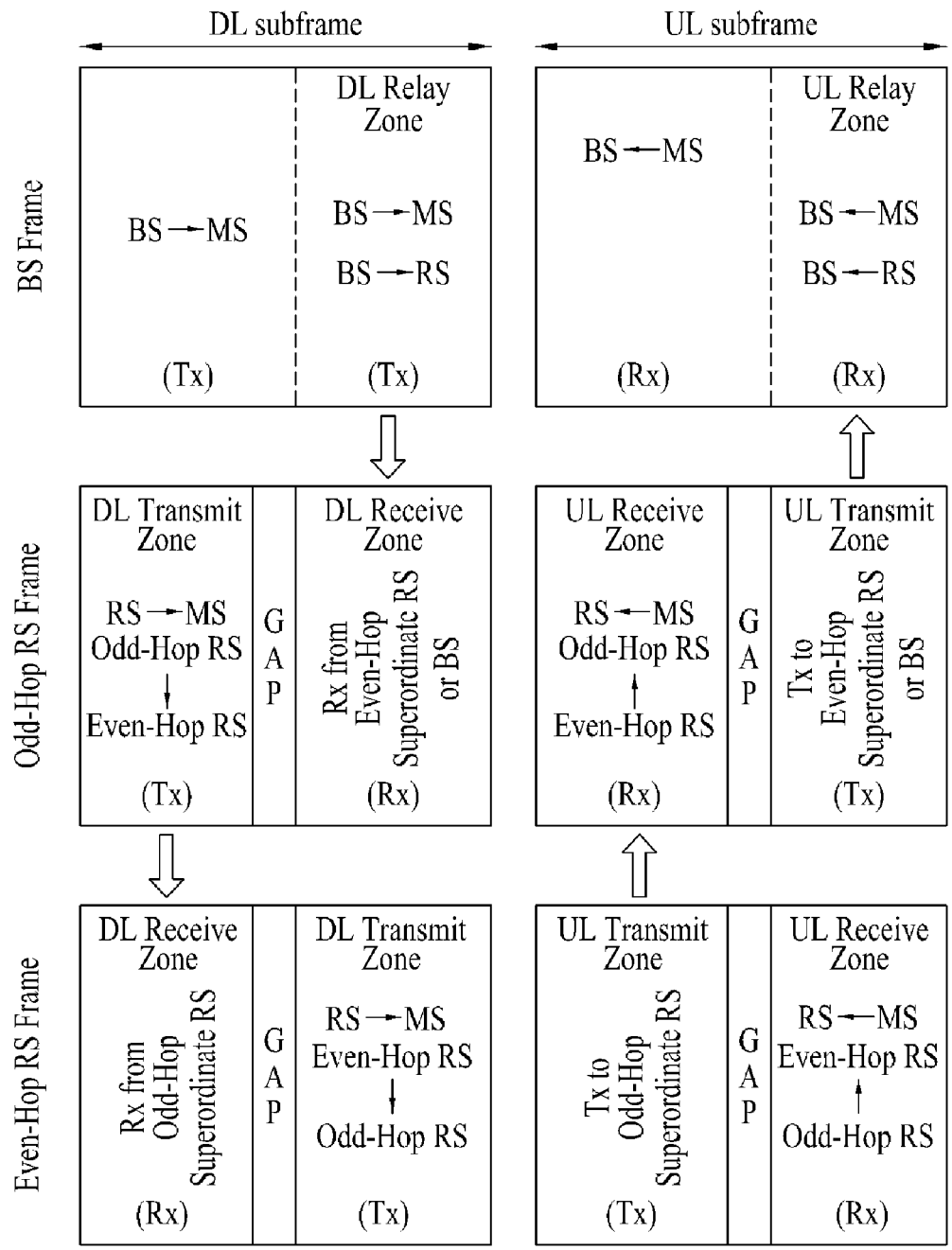
FIG. 4 is a diagram illustrating an example of a uni-directional relay frame structure that can be used in the embodiments of the present invention.

FIG. 4 is a diagram illustrating an example of a uni-directional relay frame structure that can be used in the embodiments of the present invention.

In the embodiments of the present invention, a relay station (RS) can be divided into an odd-hop RS and an even-hop RS depending on the number of hops with the base station BS. The odd-hop RS and the even-hop RS can have a layer structure, and one network can include one or more odd-hop relay stations RS and one or more even-hop relay stations RS.

A frame structure used in the base station includes a downlink frame structure and an uplink frame structure. In this case, the downlink frame structure includes a downlink (DL) access zone and a DL relay zone while the uplink frame structure includes a UL access zone and a UL relay zone.

The downlink access zone represents an interval where the base station BS transmits data packets to the mobile station MS while the uplink access zone represents an interval where the mobile station MS transmits data packets to the base station BS. Also, in the downlink relay zone, the base station BS can relay data packets to the mobile station or the relay station RS. In the uplink relay zone, the mobile station MS or the relay station RS can relay data packets to the base station BS.

The frame structure used in the odd-hop RS includes a transmit zone and a receive zone. For example, the downlink includes a DL transmit zone and a DL receive zone. Also, the uplink includes a UL receive zone and a UL transmit zone.

The odd-hop RS can relay and transmit data packets to the mobile station or the subordinate RS (for example, even-hop RS) in the downlink transmit zone. Also, the odd-hop RS can receive the data packets relayed from the subordinate RS (for example, even-hop relay) in the downlink receive zone.

The odd-hop RS can receive the data packets relayed from the mobile station MS or the subordinate RS (or even-hop RS) in the uplink receive zone. Also, the odd-hop RS can transmit the data packets relayed from the subordinate RS or the mobile station to the superordinate RS (or base station) in the uplink transmit zone.

The frame structure used in the even-hop RS includes a transmit zone and a receive zone. For example, the uplink includes a DL transmit zone and a DL receive zone. Also, the uplink includes a UL receive zone and a UL transmit zone.

In this case, the frame structure used in the even-hop RS is similar to the frame structure used in the odd-hop RS. However, in case of the even-hop RS, the superordinate RS could be the odd-hop RS, and the subordinate RS could be the mobile station or another odd-hop RS.

Figure 5:
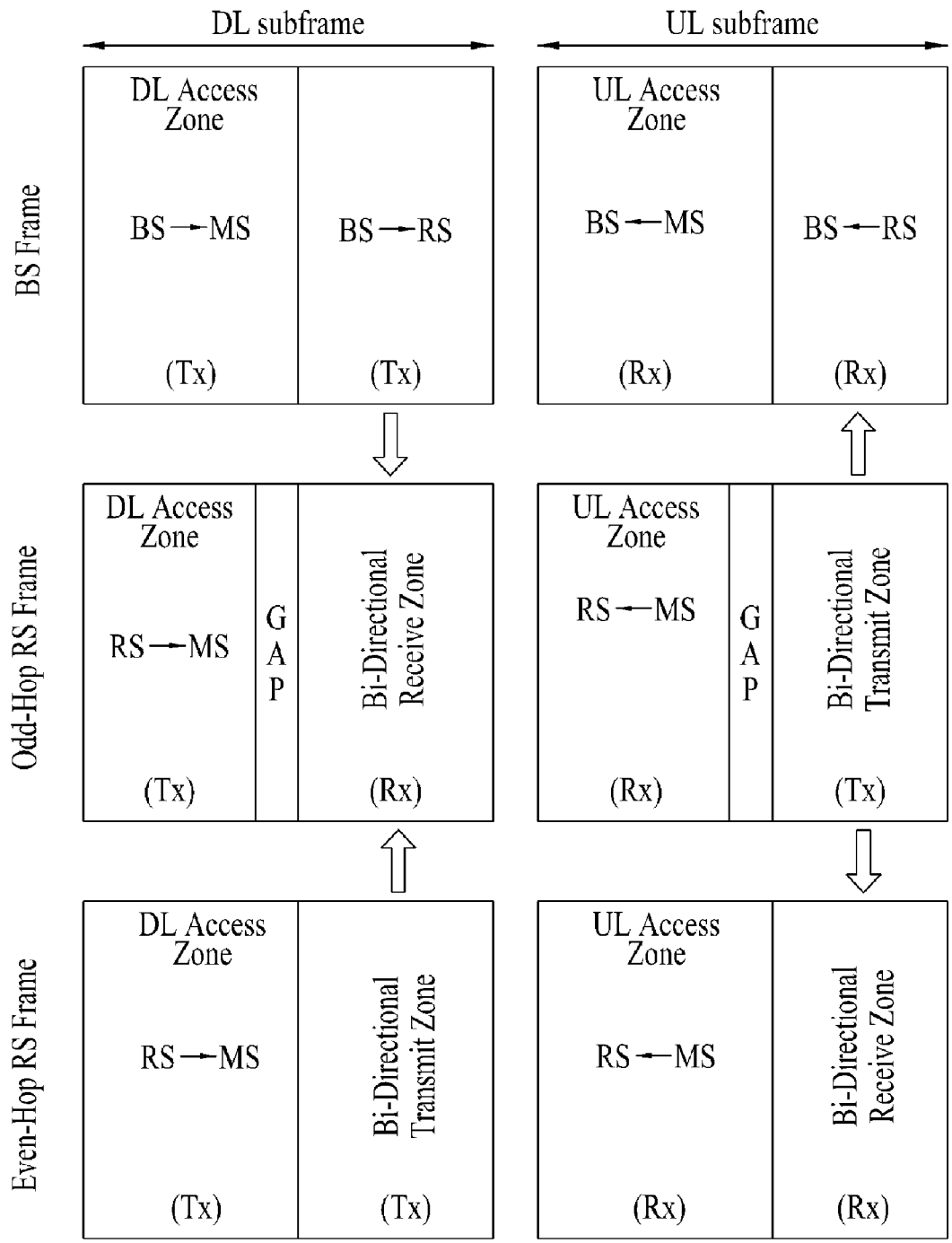
FIG. 5 is a diagram illustrating an example of a bi-directional relay frame structure that can be used in the embodiments of the present invention.

FIG. 5 is a diagram illustrating an example of a bi-directional relay frame structure that can be used in the embodiments of the present invention.

FIG. 5 is different from FIG. 4 in that a bidirectional transmit zone and a bidirectional receive zone exist in FIG. 5. In FIG. 5, the frame structure used in the base station includes a downlink subframe and an uplink subframe. In this case, the downlink subframe includes a downlink access zone and a downlink relay zone. Also, the uplink subframe includes an uplink access zone and an uplink relay zone.

At this time, the base station can transmit data packets to the mobile station in the downlink access zone. Also, the base station can relay the data packets to the relay station in the downlink relay zone. Furthermore, the base station can receive the data packets from the mobile station in the uplink access zone, and receive the relayed data packets from the relay station.

The frame structure used in the odd-hop RS includes a downlink access zone, a downlink bi-directional receive zone, an uplink access zone, and an uplink bi-directional transmit zone. In this case, a gap zone can be included between the downlink access zone and the bi-directional receive zone and between the uplink access zone and the bi-directional transmit zone as a protective interval.

The frame structure used in the even-hop RS includes a downlink access zone, a downlink bi-directional transmit zone, an uplink access zone, and an uplink bi-directional receive zone.

The bi-directional transmit zone is a transmission interval of the odd-hop RS or the even-hop RS and can transmit the relayed data packets to the superordinate RS or the subordinate RS. Also, the bi-directional receive zone can receive the relayed data packets from the odd-hop RS or the even-hop RS.

In FIG. 5, the downlink access zone represents an interval where the base station transmits data packets to the mobile station or the relay station transmits the relayed data packets to the mobile station. Also, the uplink access zone represents an interval where the mobile station transmits data packets to the base station or the mobile station transmits the data packets to the odd-hop RS or the even-hop RS.

The frame structures shown in FIG. 4 and FIG. 5 represent that a TDD is supported within one frame of a period of 5 msec. The frame structures of FIG. 4 and FIG. 5 can be applied to an FDD, and can be interpreted as TDD/FDD mode operations of a plurality of frames. Also, the respective zones can be established in a unit of subframe for a frame that includes one or more subframes or in a unit of frame for one or more frames.

In the embodiments of the present invention, a part defined as a preamble can be defined as a super frame header that includes a broadcast channel. Also, the preamble includes a synchronization channel SCH and a broadcast channel BCH, and can be used as the synchronization channel SCH and the broadcast channel BCH.

Hereinafter, a method of transmitting a synchronization channel or a broadcast channel from a base station BS and a relay station RS to a mobile station or a subordinate relay station to support a multi-hop relay will be described.

Referring to FIG. 4 and FIG. 5, in case of the multi-hop relay, a specific relay station divided into an odd-hop relay station and an even-hop relay station can be configured in such a manner that signal and data transmission and reception are varied in the same time zone and/or resource zone.

For example, in case of the uni-directional relay structure as shown in FIG. 4, although the odd-hop RS is operated in a transmission mode for the downlink access zone of the base station, the even-hop RS can be operated in a reception mode. Accordingly, the frame structure in view of the relay station is different from the frame structure in view of the base station, and the frame structure can be varied within the relay station depending on the odd-hop RS and the even-hop RS.

Also, broadcast control information such as system configuration information and a preamble for system synchronization and handover should be acquired by the superordinate RS, the subordinate RS, and the mobile station that operates in each relay station. Accordingly, a frame structure that can support a multi-hop relay is required. If the respective relay stations include different transmission and reception modes, design and transmission of a control signal for supporting the transmission and reception modes will be required.

In the embodiments of the present invention, offset information is defined to indicate the difference of transmission and reception modes among the base station, the odd-hop relay station and the even-hop relay station. For example, control information can be configured by preamble offset or super frame header offset (SFH offset) in view of the base station. Also, control information can be configured by frame offset in view of the relay station.

In case of the multi-hop relay, the base station can be operated in the downlink access zone and the downlink relay zone of the downlink together with one-hop relay station (for example, odd-hop RS) based on the base station. Also, the base station can be operated in the uplink access zone and the uplink relay zone of the uplink together with one-hop relay station.

At this time, one-hop RS corresponding to the odd-hop RS should synchronize with the base station BS through a preamble during initial network entry and acquire cell-ID of the base station BS. Also, the hop RS should acquire frame configuration information by receiving the BCH from the base station. In this case, the frame configuration information includes system configuration information and zone configuration information.

The zone configuration information can include information of relay operation. The information of relay operation includes configuration information of relay operation and access operation, centralized scheduling or distributed scheduling information, transparent operation and/or non-transparent operation information, and cooperative operation information.

Transmission of the control information and the synchronization channel can be applied to multi-hop at the same meaning as the one-hop operation. In the embodiments of the present invention, zone configuration corresponding to the zone configuration information, and definition and correlation of frame offset and preamble offset according to the zone configuration will be disclosed. Also, in the embodiments of the present invention, a method of setting frame structures of the base station, the odd-hop RS and the even-hop RS will be disclosed.

In the embodiments of the present invention, the part defined and shown as a preamble can include a BCH and/or SCH, and can be defined as the super frame header (SFH).

Hereinafter, a method of transmitting a preamble (or SCH/BCH) from a base station to support a relay system will be described. Also, methods of receiving control information from a base station or a superordinate RS to a relay station (RS) will be described. The control information can be transmitted using a frame offset value or a preamble offset value.

The frame offset represent the time when the relay station RS receives the SCH or the BCH of the base station BS or the superordinate RS. The frame offset can represent an offset value from a beginning symbol of each frame or an offset value based on a transmission time of the SCH or the BCH for the mobile station in the current frame.

The frame offset can be transmitted through the BCH that includes control information. Table 1 shows an example of a frame offset format.

TABLE 1

| Frame Offset format | size (bits) | Note |
| --- | --- | --- |
| ~ | — | |
| Frame symbol offset | 8 | |
| SCH/BCH period | 8 | |
| Next Frame symbol offset | 8 | |
| ~ | — | |

Referring to Table 1, the frame offset includes frame symbol offset indicating a frame (or subframe) to which a BCH or SCH is transmitted, a BCH/SCH period parameter indicating a transmission period of the SCH or BCH, and next frame symbol offset indicating a frame to which next SCH or BCH is transmitted.

The preamble offset is control information transmitted from the base station or the relay station, and allows the mobile station located within a service zone of the base station or the relay station to periodically acquire synchronization with the base station or the relay station or receive BCH information.

TABLE 2

| Preamble Offset | Size(bits) | Note |
|---|---|---|
| ~ | — | |
| Preamble Symbol Offset | 8 | |
| Next Preamble Symbol Offset | 8 | |
| ~ | — | |

If hop information (for example, even-hop or odd-hop through 1 bit indicator or the number of hops using one or more bits) of the RS and preamble offset are received through the SCH or BCH, the mobile station MS can identify the reception time of each of the SCH and the BCH depending on the odd-hop RS or the even-hop RS.

If the transmission time of the SCH and/or the BCH is changed, the preamble offset can represent the transmission time of next SCH and/or BCH during SCH and/or BCH transmission from the current frame.

At this time, if the base station and the relay station transmit the SCH and the BCH for subordinate RS at the same time as the transmission time of the SCH and the BCH for the mobile station, or if the base station and the relay station transmit the BCH in a stagger type, a synchronization (Sync.) indicator is required.

For example, if the synchronization indicator indicates '0' as a size of 1 bit, it represents that the base station and the RS within the base station transmit control information (BCH or SCH) for a mobile station within a cell at the same time. Also, if the synchronization indicator indicates '1', it represents that the base station and the RS within the base station transmit control information (BCH or SCH) for a mobile station within a cell at a different time (for example, staggering).

If the base station and the subordinate RS transmit the SCH and the BCH at the same time (Sync Indicator=0), the mobile station within the base station can acquire synchronization with the base station at the same time without separate signal transmission for SCH frequency portion from a neighboring cell when performing neighboring cell search.

If the base station and the subordinate RS do not transmit the SCH and the BCH at the same time (Sync Indicator=1), a procedure of exchanging control information such as frame symbol offset and preamble symbol offset between neighboring cells is required.

Figure 6:
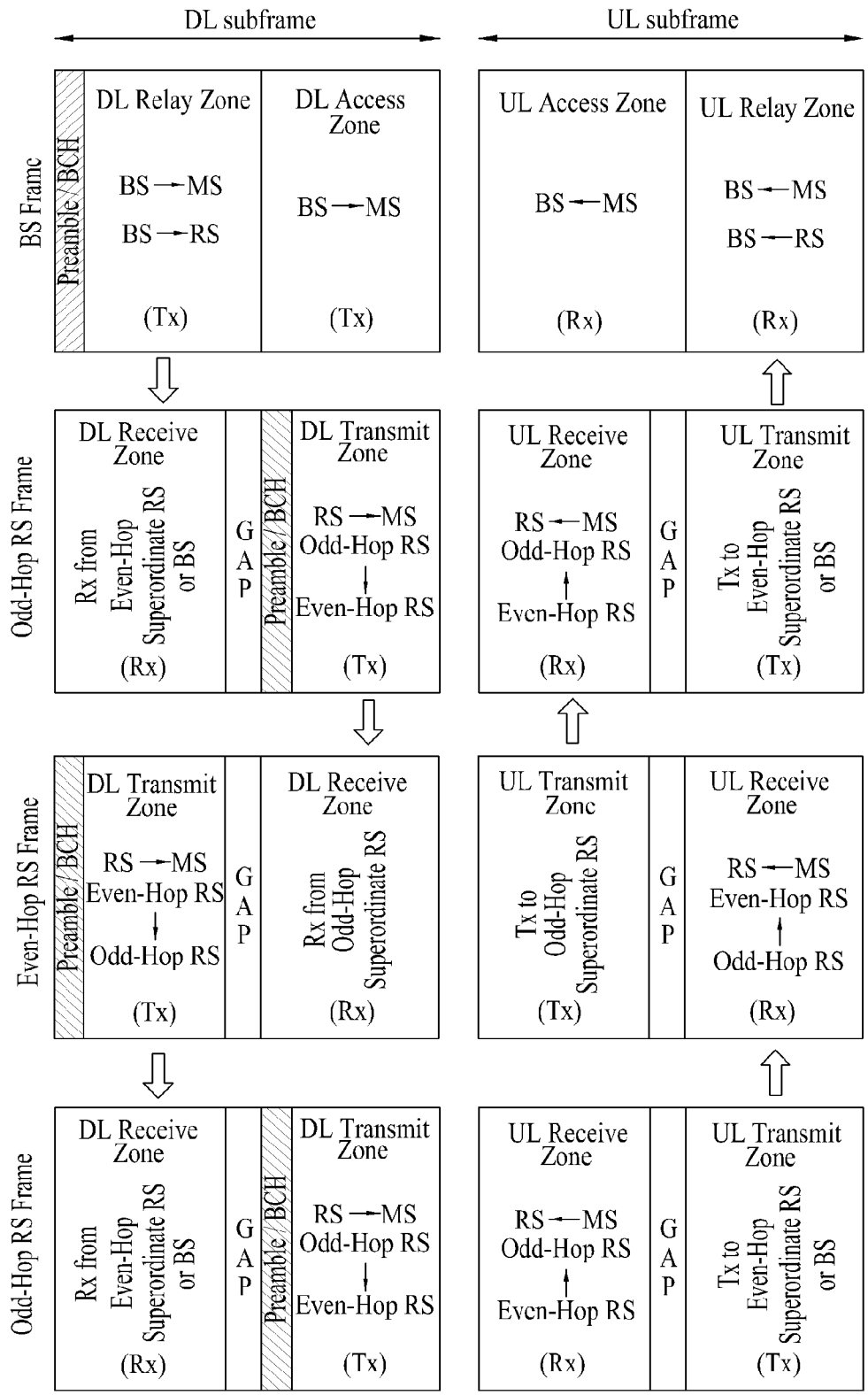
FIG. 6 is a diagram illustrating an example of a uni-directional relay frame structure according to one embodiment of the present invention.
Figure 7:
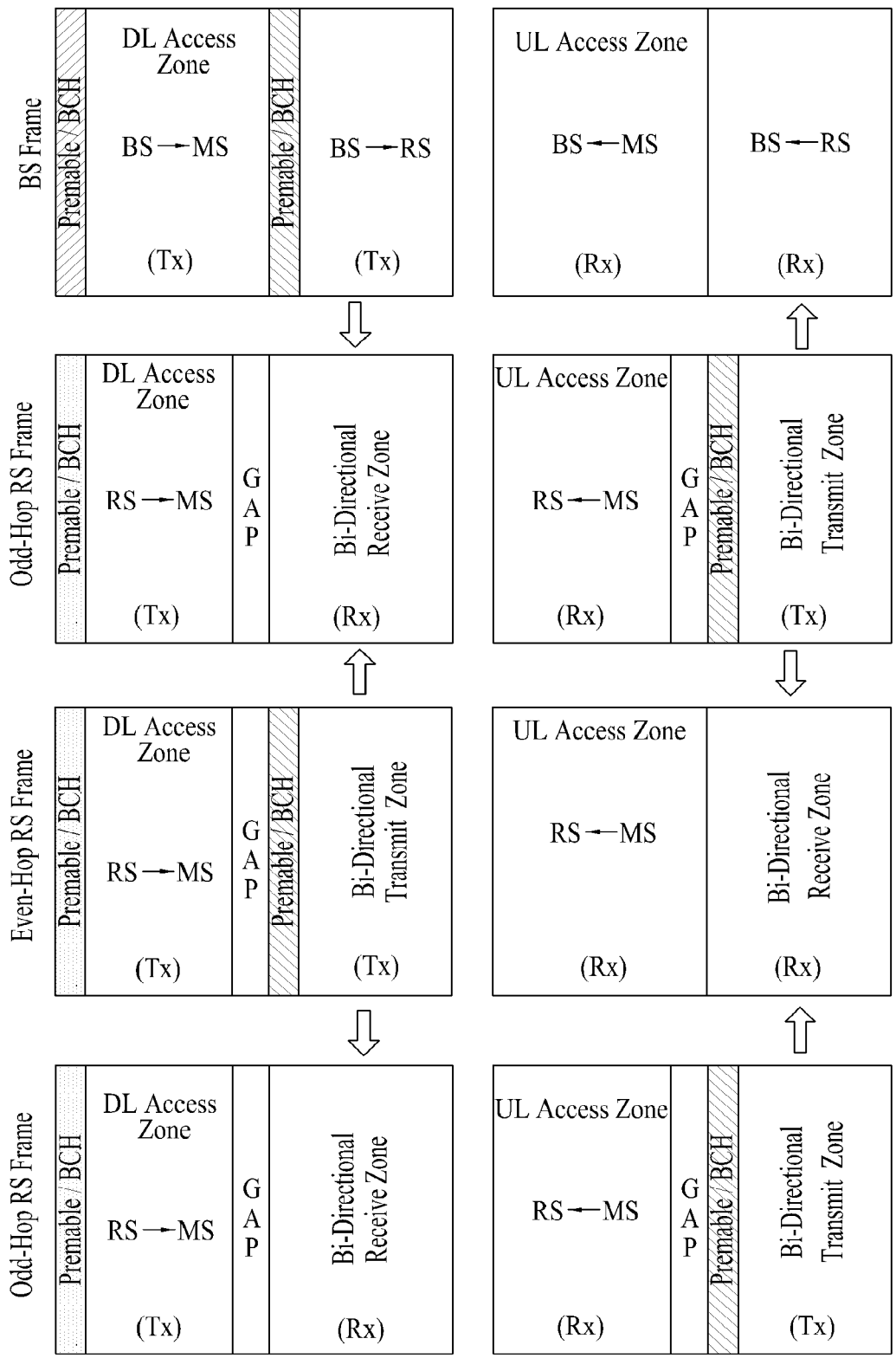
FIG. 7 and FIG. 8 are diagrams illustrating a frame structure considering a uni-directional relay operation in accordance with one embodiment of the present invention.
Figure 8:
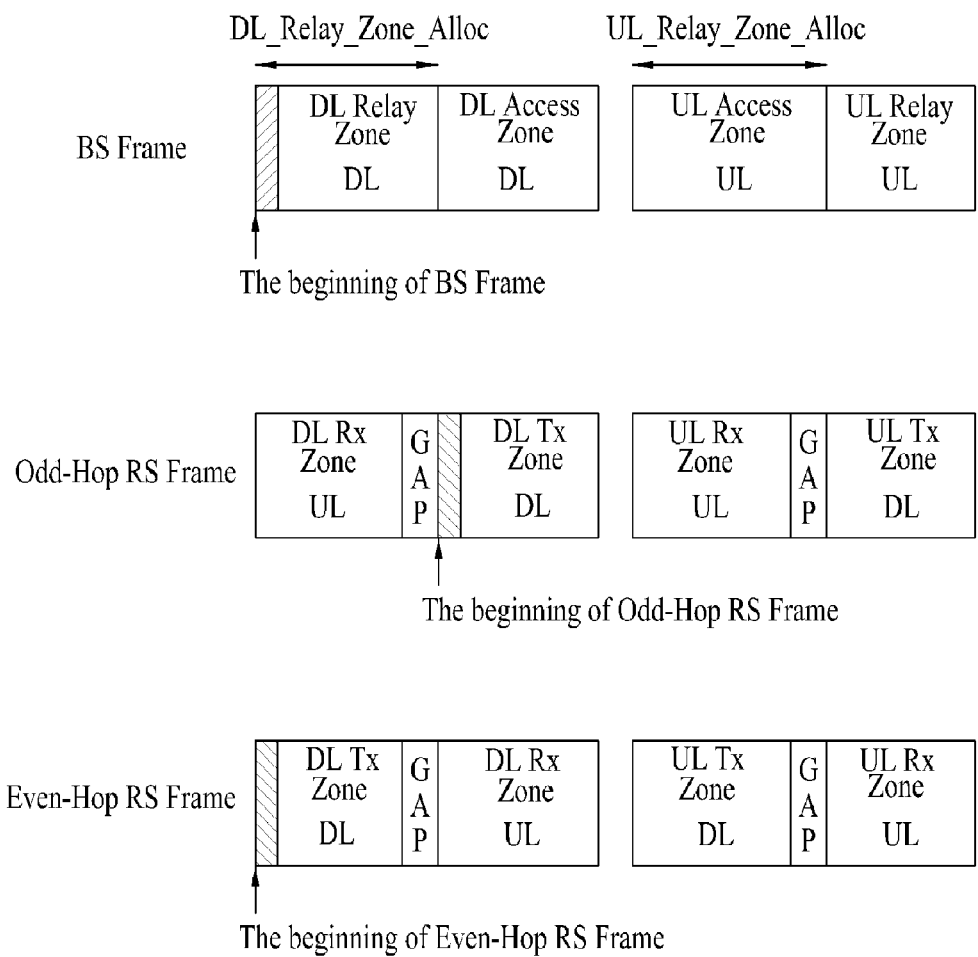

FIG. 6 is a diagram illustrating examples of a uni-directional relay frame structure according to one embodiment of the present invention. Also, FIG. 7 and FIG. 8 are diagrams illustrating a frame structure considering a uni-directional relay operation in accordance with one embodiment of the present invention.

The relay frame structure includes two zones in each of the downlink and the uplink. The downlink zone (DL zone; DL subframe) represents a resource zone where the base station and the relay station are operated in a transmission mode for the mobile station or the subordinate relay station. The uplink zone (UL zone; UL subframe) represents a resource zone where the base station and the relay station are operated in a reception mode for the mobile station or the subordinate relay station.

In FIG. 6, downlink subframes of the base station are arranged in the order of the downlink (DL) relay zone and the DL access zone, and downlink subframes of the odd-hop RS are arranged in the order the DL receive zone, GAP, and the DL transmit zone. Also, downlink subframes of the odd-hop RS are arranged in the order of the DL transmit zone, GAP, and the DL receive zone.

Accordingly, the base station can simultaneously transmit the same preamble and/or system information to the mobile station MS and the subordinate RS in the DL relay zone. In this case, in the frame structure of FIG. 6, data are transmitted to the mobile station or the subordinate RS in the DL transmit zone of each RS. The preamble and/or broadcast channel (BCH) transmission structure of FIG. 6 is expressed by requisite channel information of system configuration, and frame configuration having no relation with the system configuration can be interpreted as an effective multi-hop frame structure when considering latency reduction gain.

In FIG. 6, if the mobile station and the subordinate RS simultaneously acquire synchronization and system information through the SCH/BCH transmitted from the base station or the relay station, the base station can transmit a preamble and/or BCH, which includes one of SCH/BCH transmission period information and frame symbol offset information, to the mobile station or the subordinate RS in the downlink relay zone while the even-hop RS can transmit the same to the mobile station or the subordinate RS in the downlink transmit zone.

Furthermore, the odd-hop RS can express the transmission time of information for receiving SCH/BCH in the subordinate RS, i.e., even-hop RS as offset from a frame beginning symbol through the frame symbol offset or represent offset from the time after SCH/BCH transmission from a previous frame.

For example, if the odd-hop RS or the even-hop RS transmits the SCH or the BCH at a given time and each RS is used fixedly, the base station or the superordinate RS can periodically transmit frame symbol offset information of each of the even-hop RS and the odd-hop RS to the mobile station through the BCH of the super frame header (SFH). Then, the mobile station can receive a relay service based on information acquired during initial access.

FIG. 6 can be expressed in the same manner as FIG. 7 and FIG. 8. In this case, FIG. 7 illustrates that the downlink zone is configured in the order of the relay zone and the access zone in view of the base station, and FIG. 8 illustrates that the downlink zone is configured in the order of the access zone and the relay zone in view of the base station. In FIG. 6 to FIG. 8, in order to perform the relay operation in the downlink zone and the uplink zone, transmission of zone configuration information such as zone switch IE is required.

In FIG. 7 and FIG. 8, such configuration information can be referred to as relay zone allocation information or zone allocation information. The relay zone allocation information can include downlink relay zone allocation (DL_Relay_Zone_Alloc) information and uplink relay zone allocation (UL_Relay_Zone_Alloc) information. Preferably, basic unit of the relay zone allocation information is set in a unit of subframe (for example, five or more symbols). Also, relay zone allocation parameters may be set at the same value depending on the downlink and/or the uplink, or may be set at different values.

In FIG. 7 and FIG. 8, zone allocation information required for frame configuration in view of the base station and the relay station includes one of (1) DL/UL ratio, (2) cyclic prefix (CP) length or the number of symbols within a frame, (3) subframe configuration information and/or (4) DL/UL relay zone allocation information. At this time, examples of the subframe configuration information include subframe configuration information within a frame of 5 ms for a plurality of subframe types, the number of subframes within a subframe, idle mode/mute subframe information.

For example, if a CP length is ⅛ of a useful symbol Tu in a frame of 5 ms, i.e. when considering ⅛TU CP, 48 OFDM symbols are used in one frame. One of the OFDM symbols is used as TTG/RTG, and the other OFDM symbols constitute eight subframes that include seven subframes of six symbols and one subframe of five symbols.

At this time, if a TDD DL/UL ratio is 5:3, two subframes are configured by DL Relay_Zone_Alloc and one subframe is configured by UL Relay_Zone_Alloc, frame configuration in view of the base station BS can configure a zone for supporting a relay per subframe of DD/DDD/U/UU.

Accordingly, if one frame is configured by maximum eight subframes, it is preferable that DL/UL Relay Zone Alloc includes 3 bit information. This zone allocation information can complete frame configuration in view of the final base station and relay station through type information as to whether the corresponding relay station is the even-hop relay station or odd-hop relay station and relay Tx/Rx operation information.

The mobile station and the relay station can acquire information of the even-hop relay station and the odd-hop relay station through a preamble or BCH. Also, the relay Tx/Rx operation information is information of the order of the relay zone and the access zone in view of the base station, and can include transmit zone information and information of uni-directional or bi-directional frame structure. The relay Tx/Rx operation information can previously be set when the system is initiated. Namely, the relay Tx/Rx operation information can be set in default.

Figure 9:
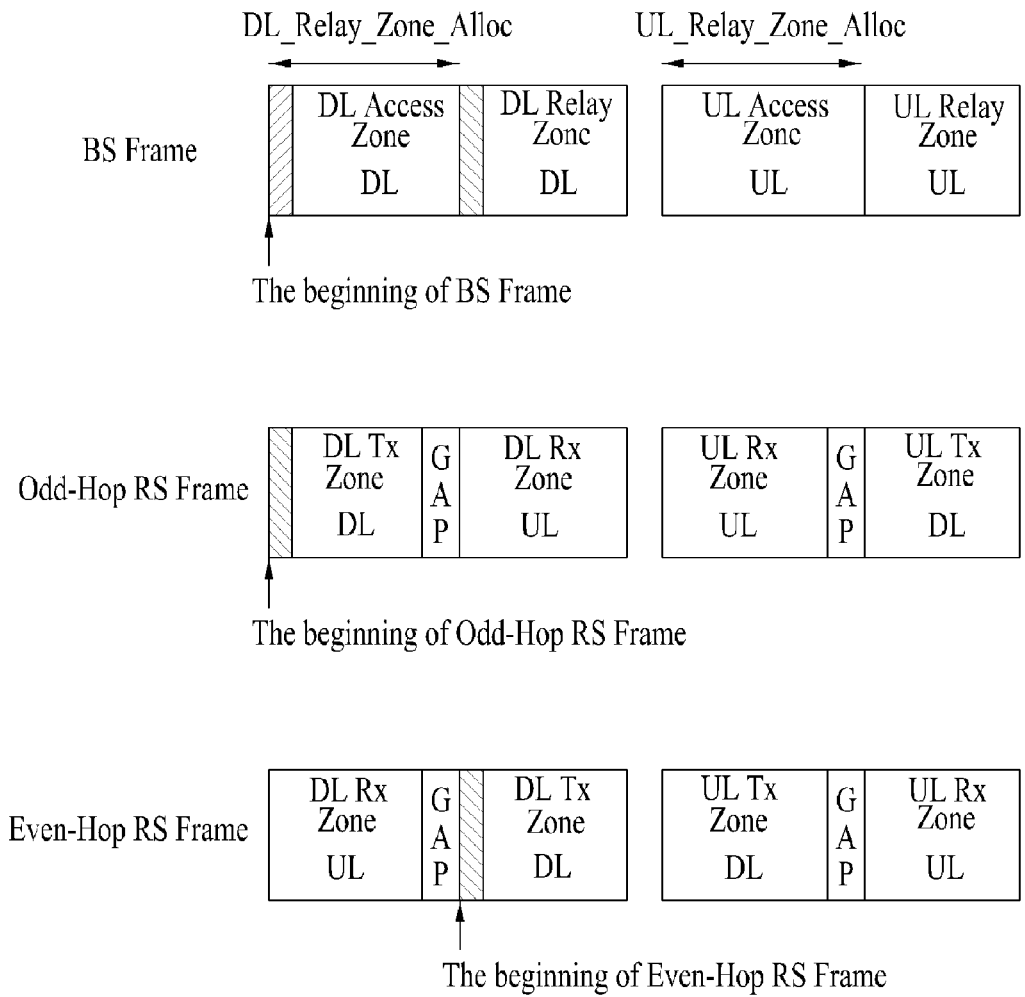
FIG. 9 is a diagram illustrating a bi-directional relay frame structure in accordance with another embodiment of the present invention.

FIG. 9 is a diagram illustrating a bi-directional relay frame structure in accordance with another embodiment of the present invention.

Referring to FIG. 9, the base station can transmit each preamble for acquiring synchronization between the mobile station MS and the relay station RS in a frame structure of the bi-directional relay zone.

For example, in order to acquire synchronization with the mobile station located in the RS zone, the base station can transmit a preamble, which includes SCH, to the mobile station in the DL access zone. Also, the base station can transmit the preamble, which includes SCH, to the subordinate RS in the DL relay zone to acquire synchronization with the relay stations. Also, each RS can transmit the preamble to the subordinate RSs to acquire synchronization with the subordinate RSs.

For example, the odd-hop RS transmits the SCH to the subordinate RS (for example, even-hop RS) in the bi-directional transmit zone after the uplink access zone while the even-hop RS transmits the SCH to the subordinate RS (for example, odd-hop RS) in the bi-directional transmit zone after the downlink access zone.

In FIG. 9, the preamble can include the SCH and/or the BCH. If the base station or the relay station transmits a broadcast control signal, it is preferable that BCH transmission in the superordinate RS for half duplex RS is performed in the bi-directional transmit zone.

At this time, if the RS transmits the preamble and/or the BCH in the uplink transmit zone, the mobile station cannot receive the corresponding BCH. Accordingly, transmission of preamble and/or BCH to the uplink in the bi-directional transmit zone can have a feature of RS-dedicated information.

Figure 10:
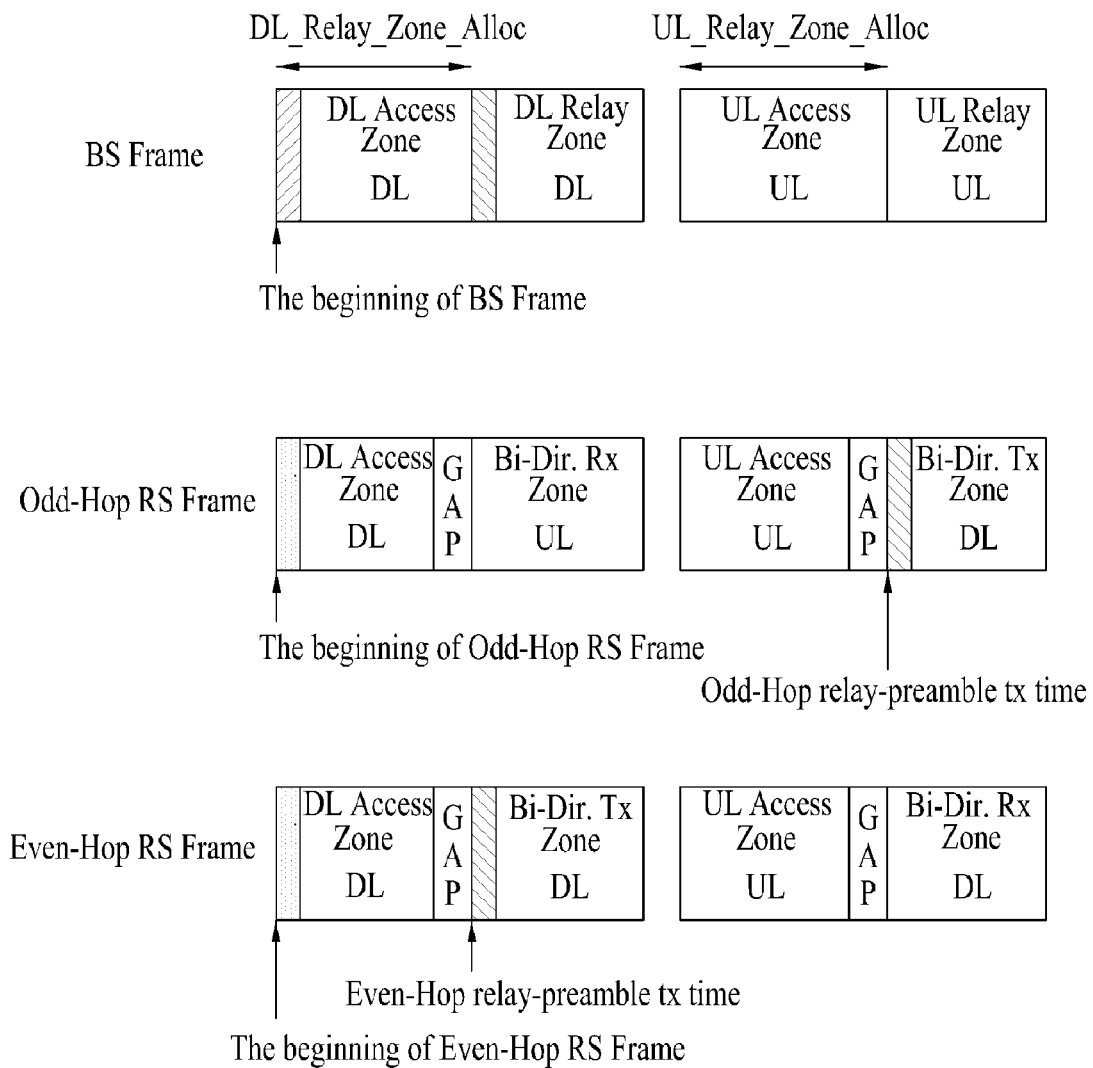
FIG. 10 is a diagram illustrating a frame structure considering a bi-directional relay operation in accordance with another embodiment of the present invention.

FIG. 10 is a diagram illustrating a frame structure considering a bi-directional relay operation in accordance with another embodiment of the present invention.

Particularly, FIG. 10 illustrates an example of frame configuration when considering the bi-directional relay operation of FIG. 9. In FIG. 10, preamble (or BCH) transmission is performed in the downlink access zone.

In view of the base station, if the base station sets a beginning position of a frame in the same manner as all relay stations, downlink relay zone allocation (DL_Relay_Zone_Alloc) information can be interpreted as preamble offset for relay preamble transmission of the even-hop RS. Also, the odd-hop RS can set its preamble transmission timing using a DL/UL ratio through the uplink relay zone allocation (UL_Relay_Zone_Alloc) information. Namely, the odd-hop RS can interpret the uplink relay zone allocation information as one preamble offset.

The beginning position of the frame can be changed in view of the relay station. For example, if the preamble transmission timing is set as a beginning of the frame in the uplink zone, UL_Relay_Zone_Alloc information can be used as frame offset. Accordingly, DL_Relay_Zone_Alloc information and UL_Relay_Zone_Alloc information can be used as one example of frame offset or preamble offset.

According to another embodiment of the present invention, when a relay frame structure is designed, a transition time is required for TX/RX operation in a half-duplex relay station. Accordingly, it is preferable that subframe configuration used in the base station is different from that used in the relay station.

This can equally be applied to subframe configuration used in the odd-hop RS and the even-hop RS. Accordingly, different subframe configuration information can additionally be indicated to the mobile station or the subordinate RS through the BCH. Also, one of the base station, the relay station and the mobile station can be set using control information such as frame offset or preamble offset.

For example, if one frame includes five downlink subframes (D1, D2, . . . , D5) and three uplink subframes (U1, U2, and U3) in ⅛ TU CP, each subframe includes six OFDM symbols. However, in D5, one OFDM symbol can be used for TTG/RTG for the transition time between the downlink and the uplink. Although each of D2 and D3 includes six OFDM symbols, the last symbol may be set as an idle symbol and five OFDM symbols may constitute one subframe. Accordingly, five OFDM symbols can be set as one first type subframe (type-1 subframe).

Likewise, in case of U2, first type subframe can be set using five OFDM symbols. In other words, if a transition time corresponding to GAP occurs, it is preferable that the last OFDM symbol of the last subframe of the corresponding zone is set as an idle OFDM symbol. At this time, it is preferable that the last subframe is not used for data transmission through scheduling in the relay station.

However, one or more OFDM symbols can be set as idle symbols. If a plurality of OFDM symbols are set as idle symbols, it is preferable that the base station or the relay station transmit information of the idle symbols to the mobile station or the subordinate RS through control information such as BCH. This is because that the beginning position of the subframe is maintained when considering the transmission timing of the subframe such as preamble transmission. Unlike this, at least one OFDM symbol located at the front of new zone identified by the transition time (for example, GAP) can be set as idle symbol.

In the embodiments of the present invention, the transmission time of the super frame header (SFH) or preamble has been, but not limited to, set as a beginning time of superframe. In the embodiments of the present invention, the transmission time of preamble may be set as a beginning time of frame or a beginning time of subframe.

Figure 11:
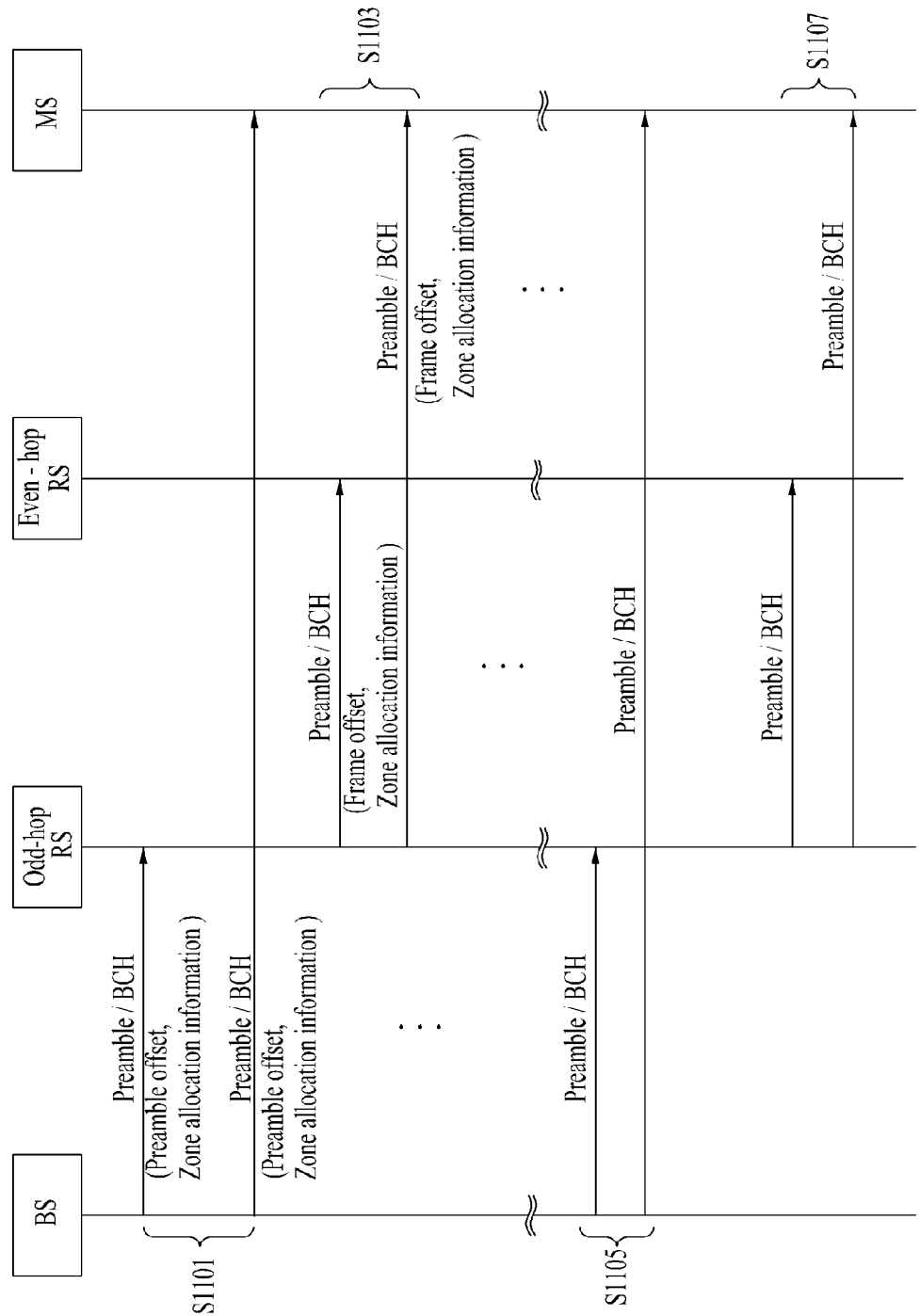
FIG. 11 is a diagram illustrating a method of transmitting control information for supporting a relay system in accordance with another embodiment of the present invention.

FIG. 11 is a diagram illustrating a method of transmitting control information for supporting a relay system in accordance with another embodiment of the present invention.

The relay system includes a base station BS, one or more relay stations (odd-hop RS and even-hop RS), and a mobile station MS. In order to support the relay system, the base station and the relay station need to report frame configuration information to the mobile station or the subordinate relay station. The frame configuration information includes offset information indicating a beginning of frame (or subframe) or zone allocation information indicating a configuration of a frame used in the relay station.

Examples of the offset information include preamble offset information used in the base station and frame offset information used in the relay station. The preamble offset information can be identified with reference to Table 1, and the frame offset information can be identified with reference to Table 2.

Referring to FIG. 11, the base station transmits a message to the odd-hop RS or the mobile station, wherein the message includes preamble offset information and zone allocation information (S1101).

In step S1101, the preamble offset information indicates a beginning time of a frame used in the base station. Also, the preamble offset information indicates a transmission time of a synchronization channel for synchronization with the base station or a transmission time of a broadcast channel that includes control information.

The zone allocation information indicates information of a structure of the frame used in the base station. For example, when a frame is configured in a TDD mode, the zone allocation information includes DL/UL ratio information, cyclic prefix (CP) length information or the number of symbols within the frame, subframe configuration information (for example, the number of subframes, the number of idle/mute subframes, etc.), and relay zone allocation information.

Also, the zone allocation information further includes type information of the corresponding relay station and relay Tx/Rx operation information. The type information indicates whether the corresponding relay station is the odd-hop RS or the even-hop RS. The relay Tx/Rx operation information indicates information of the order of the relay zone and the access zone in view of the base station. Also, the relay Tx/Rx operation information indicates frame configuration information in case of a uni-directional relay system and a bi-directional relay system. For example, in case of the uni-directional relay system, the relay Tx/Rx operation information indicates information of the order of the transmit zone and the receive zone. In case of the bi-directional relay system, the relay Tx/Rx operation information indicates information of the order of the access zone, the bi-directional transmit zone, and the bi-directional receive zone.

Furthermore, the odd-hop RS need to synchronize with the subordinate RS (for example, even-hop RS) and/or the mobile station. Accordingly, the odd-hop RS can transmit a message, which includes frame offset information and zone allocation information to the even-hop RS and the mobile station (S1103).

In step S1103, the frame offset information indicates beginning information of the frame used in the relay station in view of the relay station. For example, in case of the odd-hop RS, the frame offset information indicates a beginning time of the frame used in the odd-hop RS. Also, in case of the even-hop RS, the frame offset information indicates a beginning time used in the even-hop RS.

In step S1103, if the message, which includes frame offset information and zone allocation information transmitted from the odd-hop RS, is received, the even-hop RS and/or the mobile station can recognize that the frame used in the relay station starts from the frame indicated by the corresponding offset information. Also, the mobile station and the subordinate relay station can configure the corresponding frame (or subframe) by identifying the zone allocation information. At this time, the zone allocation information is identical with that described in step S1101.

The messages used in step S1101 and/or the step S1103 could be any one of the super frame header (SFH), the preamble, the broadcast channel (BCH), and additional system information.

Also, step S1101 and/or step S1103 may be performed periodically, or may be performed if offset information is changed (S1105, S1107).

According to another embodiment of the present invention, the mobile station and the base station (FBS, MBS) through which the aforementioned embodiments of the present invention can be performed will be described.

The mobile station can be operated as a transmitting side in the uplink, and can be operated as a receiving side in the downlink. Also, the base station can be operated as a receiving side in the uplink, and can be operated as a transmitting side in the downlink. Namely, the mobile station and the base station can include a transmitting side and a receiving side to transmit information or data.

The transmitting side and the receiving side can include a processor, a module, a part, and/or a means for performing the embodiments of the present invention. Particularly, the transmitting side and the receiving side can include a module (means) for encoding a message, a module for decoding the encoded message, and an antenna for transmitting and receiving the message. An example of the transmitting side and the receiving side will be described with reference to FIG. 12.

Figure 12:
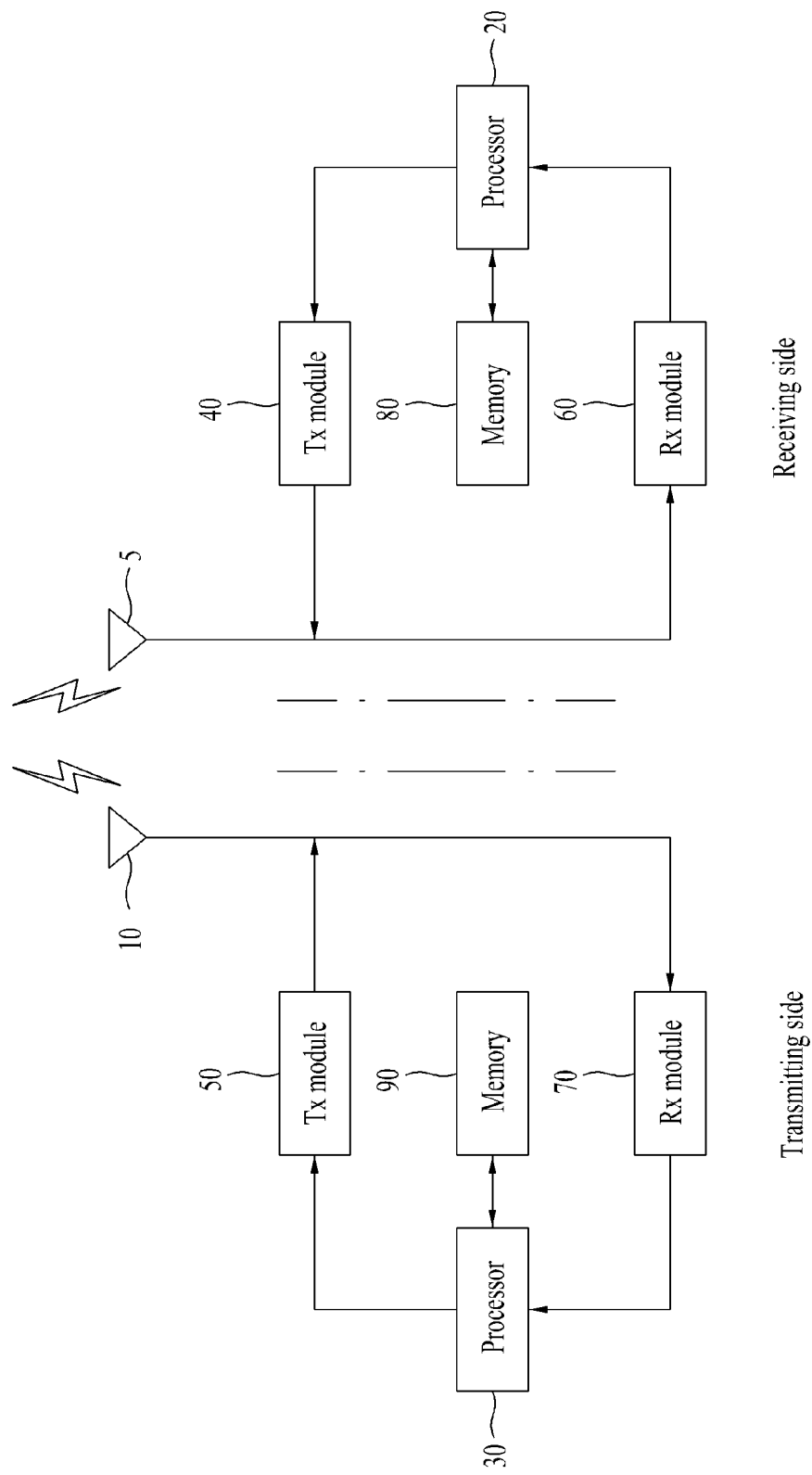
FIG. 12 is a block diagram illustrating an example of a transmitting side and a receiving side in accordance with another embodiment of the present invention.

FIG. 12 is a block diagram illustrating an example of a transmitting side and a receiving side in accordance with another embodiment of the present invention.

Referring to FIG. 12, a left side illustrates a structure of the transmitting side, and a right side illustrates a structure of the receiving side. The transmitting side and the receiving side respectively include an antenna 5, 10, a processor 20, 30, a Tx module 40, 50, an Rx module 60, 70, and a memory 80, 90. The respective modules of the transmitting side perform corresponding functions of those of the receiving side.

The antenna 5, 10 serves to transmit a signal generated by the Tx module 40, 50 to the outside or receive a radio signal from the outside to transfer the radio signal to the Rx module 60, 70. If a MIMO antenna function is supported, two or more antennas may be provided.

The processor 20, 30 generally controls the whole operation of the transmitting side or the receiving side. Particularly, processor 20, 30 can perform a controller function for performing the aforementioned embodiments of the present invention, a medium access control (MAC) frame variable control function according to service characteristics and radio wave condition, a handover function, an authentication and encryption function, etc.

Particularly, the processor of the mobile station can perform data exchange with the base station BS or the relay station RS using the frame structure according to the frame offset information and the zone allocation information described in the embodiments of the present invention.

For example, the processor can control the Tx module to receive a message, which includes one or more of the preamble, the BCH and the SCH, from the base station or the relay station, and then can determine the frame structure of the corresponding base station or relay station using the frame offset information and/or zone allocation information included in the received message and acquire synchronization. Afterwards, the processor can control the Tx module to transmit data in accordance with the acquired synchronization and the frame structure.

For another example, the processor can determine whether the corresponding RS is the even-hop RS or the odd-hop RS, using hop information included in one or more of the preamble, the BCH, and the SCH in the uni-directional and bi-directional transmit/receive zones. Accordingly, the processor can control the Tx module and the Rx module to perform data exchange with the relay station through the frame structure according to the number of hops of the corresponding relay station.

Also, the processor of the base station can allocate uplink resources required for the mobile station by analyzing the MAC message or data transmitted from the mobile station, and can generate an uplink grant for indicating allocation details to the mobile station to perform scheduling for transmitting the uplink grant. Moreover, the processor of the base station can allocate identifier such as STID and FID, which is required for the mobile station, and can generate a message, which includes frame offset information and/or zone allocation information, to transmit the message to the mobile station.

The Tx module 40, 50 performs predetermined coding and modulation for the data, which are scheduled from the processor 20, 30 and then transmitted to the outside, and then transfers the coded and modulated data to the antenna 10.

The Rx module 60, 70 performs decoding and demodulation for the radio signal received from the outside through the antenna 5, 10 to recover original data and then transfer the recovered data to the processor 20, 30.

The memory 80, 90 may store a program for processing and control of the processor 20, 30, or may perform a function for temporarily storing input/output data (in case of the mobile station, UL grant allocated from the base station, system information, STID, FID, operation time, zone allocation information, and frame offset information). Also, the memory 80, 90 can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Meanwhile, the base station can perform a controller function for performing the aforementioned embodiments of the present invention, orthogonal frequency division multiple access (OFDMA) packet scheduling, time division duplex (TDD) packet scheduling and channel multiplexing function, medium access control (MAC) frame variable control function according to service characteristics and radio wave condition, quick traffic real-time control function, handover function, authentication and encryption function, packet modulation and demodulation function for data transmission, quick packet channel coding function, and real-time modem control function through at least one of the aforementioned modules, or can further include a separate means, module or part for performing the above functions.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to various wireless access systems. Examples of various wireless access systems include 3GPP (3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

The invention claimed is:

1. A method of transmitting control information for supporting a relay system, the method performed by a relay station (RS) and comprising:
   receiving a first message at a downlink (DL) relay zone in a DL subframe from a base station (BS), the first message including preamble offset information indicating a beginning time of a transmission of a broadcast channel (BCH) signal and zone allocation information indicating configuration of odd-hop RS subframes; and
   transmitting a second message at a DL transmit zone in the DL subframe to one or more of a mobile station (MS) and a subordinate relay station (SRS), the second message including frame offset information indicating a beginning time of a transmission of a BCH signal and zone allocation information indicating configuration of even-hop RS subframes,
   wherein the beginning time of the transmission of the BCH signal is changed according to the preamble offset information, the preamble offset information presenting the beginning time of the transmission of the BCH signal from a current frame,
   wherein the DL subframe is one of eight subframes included in a frame and the frame is one of four frames included in a superframe, and
   wherein the zone allocation information of the first message includes relay type information indicating whether the RS is an odd-hop RS or an even-hop RS and relay operation information indicating a subframe configuration according to an uni-directional relay system or a bi-directional relay system.

2. The method of claim 1, wherein the even-hop RS subframes include a DL receive zone, a gap, and the DL transmit zone, when the uni-directional relay system is applied, and
   wherein the relay operation information further represents an order of the DL receive zone and the DL transmit zone.

3. The method of claim 1, wherein the even-hop RS subframes include a DL access zone, a gap, a bi-directional receive zone, and a bi-directional transmit zone, and the DL transmit zone is the bi-directional transmit zone, when the bi-directional relay system is applied,
   wherein the relay operation information further represents an order of the DL access zone, the bi-directional receive zone, and the bi-directional transmit zone, and
   wherein the RS receives messages from the BS and the SRS in the bi-directional receive zone and transmits messages to the BS and to the SRS in the bi-directional transmit zone.

4. The method of claim 1, wherein each of the first message and the second message is one of a preamble, a broadcast channel, a super frame header, and a system information message.

5. The method of claim 1, wherein the zone allocation information includes a DL/UL ratio, a CP length, subframe configuration information, and relay zone allocation information.

6. A relay station (RS) for transmitting control information for supporting a relay system, the RS comprising:
- a processor;
- a receive module;
- a transmit module; and
- an antenna transmitting a radio signal received from the outside to the receive module and transmitting a radio signal, which is transferred from the transmit module, to the outside,
- wherein the receive module performs demodulation and decoding for the radio signal transferred from the antenna,
- the transmit module performs modulation and coding for transmitting the radio signal to the outside,
- the processor controls the receive module to receive a first message at a downlink (DL) relay zone in a DL subframe from a base station (BS), the first message including preamble offset information indicating a beginning time of a transmission of a broadcast channel (BCH) signal and zone allocation information indicating configuration of odd-hop RS subframes,
- the processor controls the transmit module to transmit a second message at a DL transmit zone in the DL subframe to one or more of a mobile station (MS) and a subordinate relay station (SRS), the second message including frame offset information indicating a beginning time of a transmission of a BCH signal and zone allocation information indicating configuration of even-hop RS subframes, and
- wherein the beginning time of the transmission of the BCH signal is changed according to the preamble offset information, the preamble offset information presenting the beginning time of the transmission of the BCH signal from a current frame,
- wherein the DL subframe is one of eight subframes included in a frame and the frame is one of four frames included in a superframe, and
- wherein the zone allocation information of the first message includes relay type information indicating whether the RS is a odd-hop RS or an even-hop RS and relay operation information indicating a subframe configuration according to an uni-directional relay system or a bi-directional relay system.

7. The relay station of claim 6, wherein each of the first message and the second message is any one of a preamble, a broadcast channel, a super frame header, and a system information message.

8. The relay station of claim 6, wherein the zone allocation information of the first message includes at least one of a downlink and uplink ratio (DL/UL ratio), a cyclic prefix (CP) length, subframe configuration information, and relay zone allocation information.

9. The relay station of claim 6, wherein the even-hop RS subframes include a DL receive zone, a gap, and the DL transmit zone, when the uni-directional relay system is applied, and
- wherein the relay operation information represents an order of the DL receive zone and the DL transmit zone.

10. The relay station of claim 6, wherein the even-hop RS subframes include a DL access zone, a gap, a bi-directional receive zone, and a bi-directional transmit zone, and the DL transmit zone is the bi-directional transmit zone, when the bi-directional relay system is applied,
- wherein the RS receives messages from the BS and the SRS in the bi-directional receive zone and transmits messages to the BS and to the SRS in the bi-directional transmit zone, and
- wherein the relay operation information represents an order of the DL access zone, the bi-directional receive zone, and the bi-directional transmit zone.

* * * * *